United States Patent Office 3,105,295
Patented Oct. 1, 1963

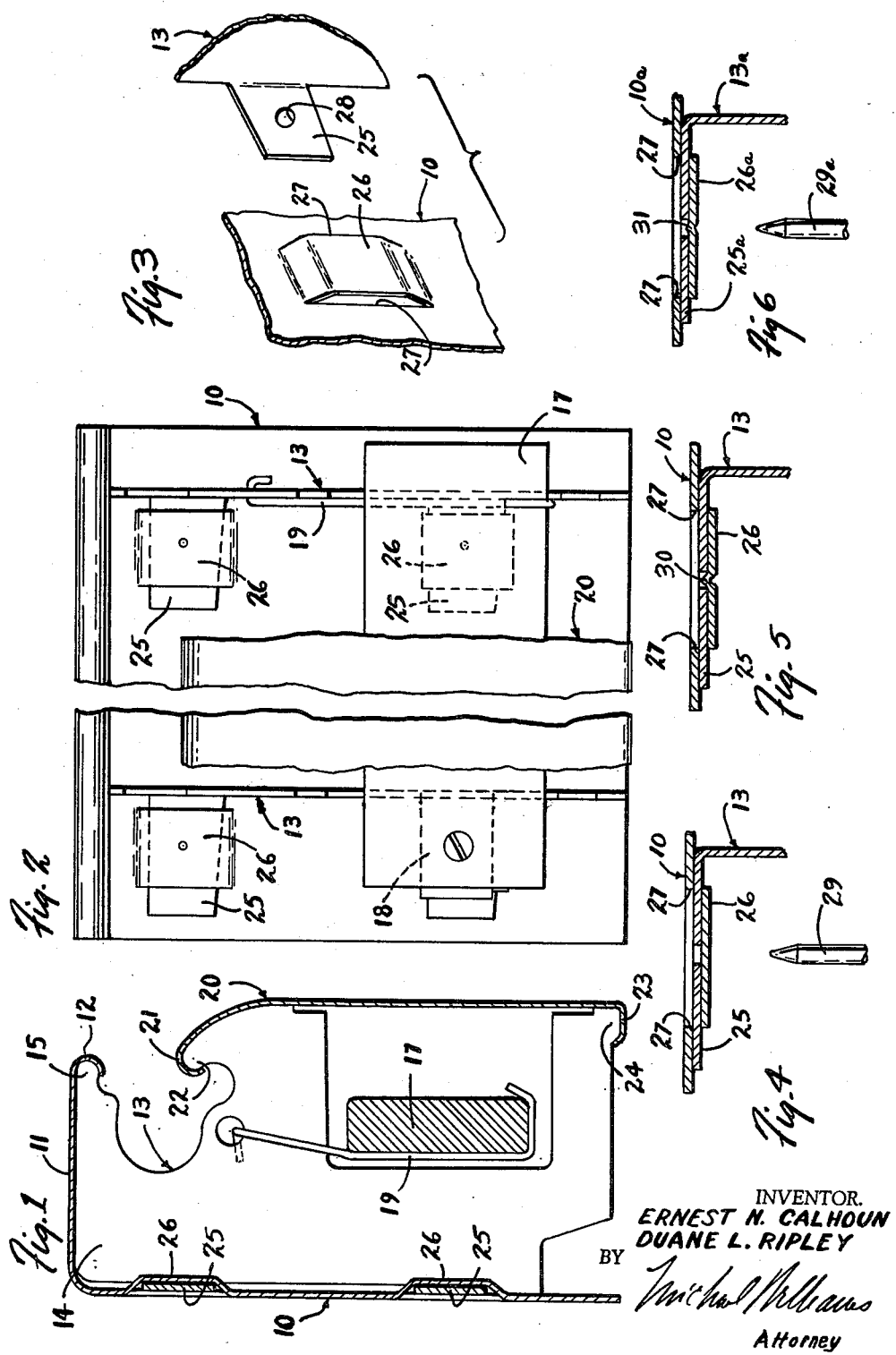

3,105,295
BASEBOARD HEATER ASSEMBLY
Ernest N. Calhoun and Duane L. Ripley, Pittsburgh, Pa., assignors to Edwin L. Wiegand Company, Pittsburgh, Pa.
Filed Oct. 2, 1959, Ser. No. 843,982
1 Claim. (Cl. 29—505)

The present invention relates to the assembly of two sheet metal members, more particularly to the assembly of sheet metal baseboard heaters, and the principal object of the invention is to provide new and improved assemblies of the character described.

Although spot welding has long been a common expedient for the high-production fastening of two sheet metal members together, this operation possesses certain undersirable features. Firstly, expensive and usually cumbersome appartus is required to make the welds and thus this operation is generally limited to use in factories and shops and is not suitable for on-the-job assembly. Secondly, disassembly of spot-welded parts without permanent damage is usually difficult if not virtually impossible. Thirdly, the efficiency of a spot weld is sometimes difficult to determine by a rapid visual inspection and thus, particularly in high production, many poorly welded parts may be turned out as a result of electrode deterioration, improper welder adjustment, operator inefficiency, or other causes, before the poor weld is detected and the cause corrected.

The present invention provides for the fastening of two sheet metal members together by a deformation of one of the members to effectuate a rigid connection whose effectiveness may readily be ascertained by a cursory visual inspection. The connection aforesaid may be made by simple, high-speed machinery where high production is required but may also be made quickly and easily by the simplest of tools for on-the-job assembly with no loss of effectiveness.

Furthermore, the connection provided by the present invention is susceptible of disassembly without permanent damage and is capable of being reassembled with no loss of effectiveness. These and other advantages will readily become apparent from a study of the following description and from the drawing appended hereto.

In the drawing accompanying this specification and forming a part of this application there is shown, for purpose of illustration, embodiments which the invention may assume, and in this drawing:

FIGURE 1 is a transverse sectional view through a baseboard heater constructed in accordance with the present invention, FIGURE 2 is a broken, front elevational view of the heater, parts on the near side being broken away to illustrate the underlying structure, FIGURE 3 is an exploded perspective view of a detail of construction, FIGURE 4 is an enlarged sectional view of the detail seen in FIGURE 3 during a stage of assembly, FIGURE 5 is a view similar to FIGURE 4 but following final assembly and, FIGURE 6 is a view similar to FIGURE 4 but of another embodiment of the invention, With reference to FIGURES 1 and 2, the assembly illustrating the present invention is a baseboard heater of the type having an elongated sheet metal back member 10 adapted to be secured to a wall surface adjacent its juncture with the floor. The upper portion of member 10 is bent away from the wall to provide an overhanging ledge 11 whose forward portion is retroverted at 12 to provide a groove for a purpose to appear.

Secured to member 10 at longitudinally spaced places and by means later to be disclosed are support members 13. Such support members project forwardly from the vertical portion of member 10 and have an upper portion 14 which underlies and supports the member ledge 11 and terminates in a rounded end 15 which fits closely in the groove provided by the retroverted member portion 12. The intermediate portion of each support 13 is cut away at 16 to pass a suitable, elongated heat generating element 17 which, in the present embodiment, is an elongated electric heating element. It is to be understood, however, that the use of an electric heating element is illustrative only and that other types of heat generating units could as well be employed.

Supports 13 presently serve two purposes: Firstly, they support the heating element 17 and, as herein disclosed (see FIGURE 2), the heating element is secured to the left-hand support 13 by means of a bracket 18 which may be welded or otherwise secured to such support. The opposite end of the heating element may be secured to the right-hand support 13 by means of a wire hook 19 which provides for ready elongation and contraction of the element 17 during heating and cooling cycles without the noises usually attendant with such cycles.

The second function of supports 13 is to support an elongated sheet metal cover plate 20. As best seen in FIGURE 1, plate 20 has a curved upper margin 21 which hooks over a horn 22 provided by an intermediate portion of each support 13 and a lower margin 23 which is sprung over and engages behind a depending abutment 24 provided by the lower portion of each support. While only two supports 13 are herein shown, one at each end of the member 10, it will be understood that similar supports may also be provided for the intermediate portions of cover plate 20 where the length of the assembly warrants additional support.

Turning now to the construction employed for securing supports 13 to member 10, each support, in the present embodiment, has a transversely extending tongue 25 which engages beneath respective strap portions 26 carried by the member 10. As best seen in FIGURE 3, each strap portion 26 is preferably formed out of member 10 by providing in the latter a pair of spaced-apart slits 27 in side-by-side relation which define the side margins of the strap portion. The intermediate strap portion is then deformed outwardly away from the adjoining surface of member 10 and in a direction shown, an amount sufficient to provide a pocket for closely receiving a respective tongue 25.

It is to be noted that each tongue 25 is of a length greater than the width of the strap portion so that it spans the opening remaining in the member 10 after the intermediate strap portion is deformed outwardly as above described and engages the adjoining surfaces of member 10 adjacent respective side margins of the strap portion. For a purpose to appear, each tongue 25 has an aperture 28 formed therein.

With the tongue 25 disposed in its pocket between a strap portion 26 and the adjacent surface of member 10 as illustrated in FIGURE 4, strap portion 26 need only be struck with a punch 29, or like instrument, to indent the strap portion into the tongue aperture 28 in order to securely fasten the parts together. As seen in FIGURE 5 wherein the strap portion is indented to provide a projection 30 within the tongue aperture 28, such projection and the defining aperture margin form interlocking abutments which retain the parts in assembled relation. In the event disassembly is required, it is a simple matter to flatten out the projection 30, by striking it from the back side, whereupon the tongue may readily be withdrawn from its pocket.

Where factory assembly of the parts is desired, punch 29 may be driven by a suitable press or the like. On the other hand, where on-the-job assembly is required, a punch and a hammer are the only tools necessary to fasten the parts together.

In the embodiment seen in FIGURE 6 wherein like parts are identified with the same reference characters as before but with the suffix "a" added, strap portion 26a is provided with a small dimple 31 which springs into tongue aperture 28a as the tongue 25a is slid into its pocket. This serves to accurately locate the support with respect to the member 10a where such accurate location is required. Following disposition of the tongue in its pocket as seen in FIGURE 6, the punch 29a may be employed to securely fasten the parts together as hereinbefore described.

Alternatively, instead of the dimple 31, the strap portion 26a may be formed with a small aperture which could be aligned with the tongue aperture either visually or by passing a drift member through both apertures. Thereafter, the parts may be secured together as previously disclosed.

In view of the foregoing it will be apparent to those skilled in the art that we have accomplished at least the principal object of our invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim:

The method of assembling two members, one having an apertured sheet metal tongue and the other having a sheet metal strap projecting from the body thereof and forming therebetween a space closely receiving said tongue, said strap having an inwardly directed dimple, which method comprises disposing said tongue within said space with said aperture underlying said strap and aligned with said dimple, and pressing against the outer surface of said strap with a tool having a cross-sectional shape complementary to the size and shape of said aperture, the pressing action being confined to the dimple area of said strap and being of sufficient force to deform such area inwardly into said aperture and into engaging relation with the marginal edge defining said aperture.

References Cited in the file of this patent

UNITED STATES PATENTS

| | | |
|---|---|---|
| 2,112,247 | McLoughlin | Mar. 29, 1938 |
| 2,427,393 | Eckel | Sept. 16, 1947 |
| 2,869,694 | Breckheimer | Jan. 20, 1959 |
| 2,872,162 | Marini | Feb. 3, 1959 |
| 2,970,678 | Brinen | Feb. 7, 1961 |